United States Patent [19]

Medem et al.

[11] Patent Number: 4,506,066
[45] Date of Patent: Mar. 19, 1985

[54] THERMOPLASTIC POLYCARBONATES, THEIR PREPARATION AND THEIR USE AS SHAPED ARTICLES AND FILMS

[75] Inventors: Harald Medem; Manfred Schreckenberg; Rolf Dhein; Werner Nouvertné; Hans Rudolph, all of Krefeld, Fed. Rep. of Germany

[73] Assignee: Bayer Aktiengesellschaft, Leverkusen, Fed. Rep. of Germany

[21] Appl. No.: 487,337

[22] Filed: Apr. 13, 1983

Related U.S. Application Data

[63] Continuation of Ser. No. 186,999, Sep. 15, 1980, abandoned.

[30] Foreign Application Priority Data

Sep. 22, 1979 [DE] Fed. Rep. of Germany ....... 2938464

[51] Int. Cl.$^3$ .............................................. C08G 63/62
[52] U.S. Cl. .................................... 528/196; 528/198; 528/199; 528/204; 528/271; 528/370; 528/372
[58] Field of Search ............... 528/196, 204, 201, 198, 528/199, 370, 372, 271

[56] References Cited

FOREIGN PATENT DOCUMENTS 1079686  8/1967  United Kingdom .

OTHER PUBLICATIONS

Encyclopedia of Polymer Science and Technology, Plastics, Resins, Rubbers, Fibers, John Wiley & Sons, Inc., 1969, vol. 10, p. 726.

*Primary Examiner*—Harold D. Anderson
*Attorney, Agent, or Firm*—Gene Harsh; Lawrence S. Pope; Aron Preis

[57] ABSTRACT

The present invention relates to high molecular weight thermoplastic hexahydro-furo-(3,2-b)-furane-3,6-diol based copolycarbonates useful as molding resins and to a method for their preparation.

15 Claims, No Drawings

THERMOPLASTIC POLYCARBONATES, THEIR PREPARATION AND THEIR USE AS SHAPED ARTICLES AND FILMS

This application is a continuation of Ser. No. 186,999 filed Sept. 15, 1980, now abandoned.

FIELD OF THE INVENTION

The invention relates to polycarbonates and to a method for their preparation.

BRIEF DESCRIPTION OF THE INVENTION

The present invention relates to high molecular weight thermoplastic polycarbonates which contain 0.1–50 mol %, preferably 5–50 mol % and in particular 20–50 mol %, relative to the total amount of carbonate structural units in the polycarbonate molecule of carbonate structural units from hexahydro-furo(3,2-b)furane-3,6-diols of the formula I

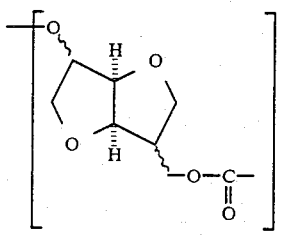

mixtures of two or more of the polycarbonates according to the invention and mixtures of the polycarbonates according to the invention with other thermoplastics, in particular with other polycarbonates based on diphenols.

DESCRIPTION OF THE PRIOR ART

Polycarbonates obtained from diphenols are old in the art. Possessing a combination of valuable properties, they have become very important materials for industrial and technological uses.

In contrast, polycarbonates obtained from aliphatic diols could hitherto find no application as structural materials. The reasons for this are the lower stability to heat and a certain difficulty in building up the high molecular weights associated with good mechanical properties. Aliphatic polycarbonates have therefore been used industrially only as oligomers, for example as diol components in polyurethane chemistry.

Yet, it has always been of interest to the chemical industry to replace raw materials derived from limited natural resources by raw materials of vegetable origin, i.e. naturally occurring, which can be produced as desired. Thus, for example, the replacement of mineral oil and the diphenols obtainable therefrom by starch and the oligosaccharides, hexitols and the like which can be produced from starch is of economic interest. In contrast to diphenols, relatively large amounts of, for example, sorbitol, are available in this way.

It is known, from British Patent Specification No. 1,079,686, that high molecular polyesters and polycarbonates can be prepared from hexahydro-furo-(3,2-b)-furane-3,6-diols of the formula II.

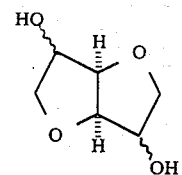

which are preparable in a simple manner by dehydration of hexitols. However, these products, polyesters and in particular, polycarbonates, cannot yet be used industrially. The reason is their unsatisfactory properties profile. Although a high molecular weight polycarbonate of 1,4; 3,6-dianhydro-D-glucitol is indeed obtained according to Example 5 of British Patent Specification No. 1,079,686. It contains higher melting, cross-linked constituents and because of these inhomogeneties possess only mediocre mechanical properties. Use of 1,4; 3,6-dianhydro-D-mannitol in this process yields but pulverulent, crystalline compositions.

Surprisingly, it has now been found, in contrast, that heterocyclic aromatic copolycarbonates which are built up from heterocyclic diols of the formula II to the extent of 0.1–50 mol %, and from diphenols to the extent of 50–99.9 mol %, in each case relative to the total molar amount of organic dihydroxy compounds employed, are tough, transparent, thermally stable thermoplastics having a general pattern of properties as good as that of the known aromatic polycarbonates.

DETAILED DESCRIPTION OF THE INVENTION

A process known for the preparation of polycarbonates is the melt transesterification method. In order to obtain high molecular polycarbonates by the melt transesterification method, as far as possible, equimolar amounts of OH equivalents resulting from diols and diphenols and of aryl carbonate or alkyl carbonate equivalents resulting from the particular sources of carbonate employed must be used and the final temperatures of the transesterification reaction must be over 300° C. However, if heterocyclic diols of the formula II are also used, branching occurs with the necessary residence times under these conditions, $CO_2$ being given off, and inhomogeneous products are thereby formed. The melt transesterification method is thus not very suitable for the preparation of the copolycarbonates according to the invention.

A preferred process for the preparation of aromatic polycarbonates is the phase boundary process (see for example, H. Schnell, Chemistry and Physics of Polycarbonates Interscience Publishers, 1964, pages 33 et seq., pages 9–14). In this process, one or more bisphenols in an aqueous alkaline solution are mixed thoroughly, with intensive stirring, with inert solvents, such as, for example, chlorinated hydrocarbons, and are converted into high molecular polycarbonates by introducing phosgene. However, if heterocyclic diols of the formula II are also used, no high molecular polycarbonates are obtained. The reason for this is the different reactivities of the aromatic bisphenols and heterocyclic diols. The method of phase boundary phosgenation is therefore unsuitable for the preparation of the polycarbonates according to the invention.

It has now been found that the copolycarbonates according to the invention can be prepared by the phase boundary process if the bis-halogencarbonic acid esters of the furane-3,6-diols II are reacted with aromatic diphenols. If a proportion of diphenols of more than 50 mol %, relative to the total molar amount of dihydroxy compounds employed, is desired, phosgene or $COBr_2$ must also be used.

The present invention thus also relates to a process for the preparation of the polycarbonates according to the invention containing 0.1 to 50 mol %, relative to the total amount of carbonate structural units in the polycarbonate molecule, of carbonate structural units of the formula I, which is characterized in that 0.1 to 50 mol %, preferably 5 to 50 mol % and in particular 20 to 50 mol %, relative to the total molar amount of diphenols and bis-halogenocarbonic acid esters of the diols II, of diols of the formula II, in the form of their bis-halogenocarbonic acid esters, are reacted with 50 to 99.9 mol %, preferably 50 to 95 mol % and in particular, 50 to 80 mol %, relative to the total amount of diphenols and bis-halogenocarbonic acid esters of the diol II, of diphenols, if appropriate in the presence of chain stoppers and if appropriate also using phosgene or $COBr_2$, at temperatures between about 0° and about 80° C., preferably between about 10° and about 30° C., by the phase boundary process.

Bis-chlorocarbonic acid esters are particularly suitable bis-halogenocarbonic acid esters.

Examples of solvents which are suitable for the organic phase of the phase boundary process are halogenated aliphatics or halogenated aromatics, such as $CH_2Cl_2$, 1,2-dichloroethane, chlorobenzene, chlorobutanes and the like. NaOH, KOH or LiOH, preferably NaOH, is used to prepare the alkaline aqueous phase, the pH value during the reaction being between 9 and 14.

Catalysts which can be used for the polycondensation are tertiary aliphatic amines, for example, those with 3 to 20 C atoms, such as triethylamine, tri-n-propylamine, tri-n-butylamine, dimethyl-benzylamine and the like, quaternary aliphatic ammonium salts, for example, those with 4 to 30 C atoms, such as tetramethylammonium bromide, tetraethylammonium bromide, tetramethylammonium chloride, tetraethylammonium chloride, trimethyl-benzylammonium chloride, trimethyl-n-butylammonium chloride, tetra-n-butyl-ammonium chloride and the like, and quaternary phosphonium salts and quaternary ammonium salts.

Phenols, such as, for example, phenol itself, alkylphenols, such as cresols or tert.-butylphenols, in particular, p-tert.-butylphenol and halogenophenols, such as p-bromophenol, p-chlorophenol, 2,4,6-tribromophenol and 2,4,6-trichlorophenol function as chain stoppers in the customary manner. The chain stoppers are used in amounts of between 0.1 and 6 mol %, relative to the number of mols of diphenols and bis-halogenocarbonic acid esters of the diols of formula II employed, depending on the desired molecular weight of the polycarbonates.

The reaction time can be between a few minutes and some hours and the reaction has in general ended after 1 to 2 hours.

The amount of $COCl_2$ or $COBr_2$, which can optimally also be used, is a function of the particular ratio of OH end groups and halogenocarbonic acid ester end groups in the starting compounds, and an excess of about 10 mol % to about 50 mol %, preferably of about 10 mol % to about 30 mol %, is used in each case.

When the reaction has ended, the organic phase, containing the polycarbonate, is washed with water and concentrated. The products can be isolated by precipitating the polycarbonates with a non-solvent, such as, for example, acetone, methanol or petroleum ether. However, the concentrated polycarbonate solutions are preferably transferred to an evaporator extruder and extruded in a known manner. The yields of polycarbonate according to the invention are virtually quantitative.

Another process for the preparation of the polycarbonates according to the invention consists of reacting the bis-chlorocarbonic acid esters of the furane-3,6-diols of formula II with aromatic diphenols in a homogeneous solution.

In this process, the aromatic dihydroxy compounds to be employed and, if appropriate, chain limiters are dissolved in one of the organic solvents mentioned above for the phase boundary process, such as, for example, $CH_2Cl_2$ or chlorobenzene, an equivalent amount of a tertiary organic base, such as, for example, N,N-dimethylaniline, dimethylcyclohexylamine or, preferably, pyridine, being added, and are reacted with corresponding amounts of bis-halogenocarbonic acid esters of the diols of formula II. If a proportion of diphenols of more than 50 mol %, relative to the total molar amount of dihydroxy compounds employed, is desired, phosgene or $COBr_2$ must also be used.

The reaction temperatures are between $-10°$ and $+120°$ C. and the reaction times are about half an hour to 12 hours. The polycarbonate solutions are worked up by a procedure in which the precipitated salt of the organic base is separated off by filtration or dissolved by adding a solvent, such as water. The organic phase, containing the polycarbonate, is washed with water and concentrated. The products can be isolated in the same manner as described above for the phase boundary process.

The present invention thus also relates to a process for the preparation of the polycarbonates according to the invention, which is characterized in that 0.1 to 50 mol %, preferably 5–50 mol % and in particular 20–50 mol %, relative to the total molar amounts of diphenols and bis-halogenocarbonic acid esters of the diols of formula II, of diols of the formula II, in the form of their bis-halogenocarbonic acid esters, are reacted with 50–99.9 mol %, preferably 50–95 mol %, and in particular 50–80 mol %, relative to the total molar amount of diphenols and bis-halogenocarbonic acid esters of the diols of formula II, of diphenols, if appropriate in the presence of chain stoppers and if appropriate also using phosgene or $COBr_2$, in a homogeneous solution, with the addition of at least equivalent amounts of tertiary organic bases, preferably pyridine.

The bis-chlorocarbonic acid esters are particularly suitable bis-halogenocarbonic acid esters. The amount of phosgene to be employed in each case is between 0 and 150 mol %, relative to the diphenols and bis-halogenocarbonic acid esters of the diols of formula II. The reaction temperatures are between $-10°$ and $+120°$ C.

Diols of the formula II which are preferably employed for the polycarbonates according to the invention are (3aR)-(3aR,6ac)-hexahydro-furo-(3,2-b)-furane-3c,6t-diol, 1,4; 3,6-dianhydro-D-glucitol, IIa; (3aR)-(3ar,6ac)-hexahydro-furo(3,2-b)-furane-3t,6t-diol, 1,4; 3,6-dianhydro-D-mannitol, IIb; (3aS)-(3ar,6ac)-hexahydro-furo-(3,2-b)-furane-3c,6c-diol, 1,4; 3,6-dianhydro-D-iditol, IIc; and (3a$_R$)-(3ar,6ac)-hexahydro-furo(3,2-b)-furane-3c,6c-diol, 1,4; 3,6-dianhydro-L-iditol, IId,

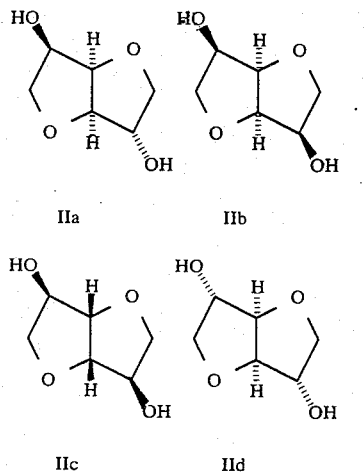

IIa  IIb

IIc  IId

The diol of the formula IIa is particularly preferred according to the invention.

The diols which can be used according to the invention are known from literature and are prepared in a simple manner, usually from the corresponding hexitols by treatment with acids. Several methods for their preparation are reported in "Beilsteins Handbuch der Organischen Chemie" (Beilstein's Handbook of Organic Chemistry"), 3rd and 4th supplement, volume 19/2, page 989 et seq. and these are incorporated herein by reference.

In principle, any diphenols are suitable for the preparation of the polycarbonates according to the invention, and those of the following formula III

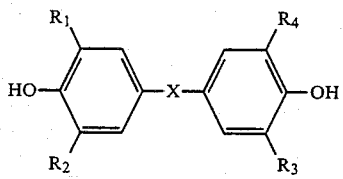

wherein

X denotes $C_1$–$C_6$-alkylene, $C_2$–$C_6$-alkylidene, $C_6$–$C_{10}$-cycloalkylene, $C_6$–$C_{10}$-cycloalkylidene,

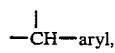

such as

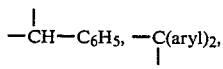

such as

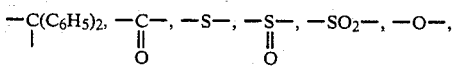

a direct bond or

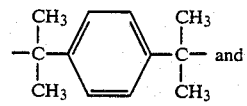

$R_1$, $R_2$, $R_3$ and $R_4$ independently denote H, $CH_3$, $C_2H_5$, O—$CH_3$, Cl or Br, are preferred.

Examples of diphenols which are suitable according to the invention are hydroquinone, resorcinol, dihydroxydiphenyls, bis-(hydroxyphenyl)-alkanes, bis-(hydroxyphenyl)-cycoalkanes, bis-(hydroxyphenyl)sulphides, bis-(hydroxyphenyl)ethers, bis-(hydroxyphenyl)ketones, bis-(hydroxyphenyl)sulphoxides, bis-(hydroxyphenyl)sulphones and α,α'-bis-(hydroxyphenyl)diisopropylbenzenes, and nuclear-alkylated and nuclear halogenated derivatives thereof. These and other suitable diphenols are described, for example, in U.S. Pat. Nos. 3,028,365; 3,275,601; 3,148,172; 2,999,835; 2,991,273; 3,271,367; 3,062,781; 2,970,131 and 2,999,846, in German Offenlegungsschriften Nos. 1,570,703; 2,063,050, 2,063,052; 2,211,956 and 2,211,957, in French Patent Specification No. 1,561,518 and in the monograph "H. Schnell, Chemistry and Physics of Polycarbonates, Interscience Publishers New York, 1964".

Preferred diphenols are, for example: 4,4'-dihydroxydiphenyl, 2,2-bis-(4-hydroxyphenyl)-propane, (bisphenol A), 2,4-bis-(4-hydroxyphenyl)-2-methylbutane, 1,1-bis-(4-hydroxyphenyl)-cyclohexane, α,α'-bis(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxy-phenyl)-methane, 2,2-bis-(3,5-dimethyl-4-hydroxyphenyl)-propane, bis-(3,5-dimethyl-4-hydroxyphenyl)sulphone, 2,4-bis-(dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particular preferred diphenols are, for example: 2,2-bis-(4-hydroxyphenyl)-propane (bisphenol A), 2,2,-bis-(3,5-dimethyl-4-hydroxyphenyl)-propane, 2,2-bis-(3,5-dichloro-4-hydroxyphenyl)-propane, 2,2-bis(3,5-dibromo-4-hydroxyphenyl)-propane and 1,1-bis-(4-hydroxyphenyl)-cyclohexane.

The polycarbonates according to the invention thus appropriately contain carbonate structural units of the formula IV

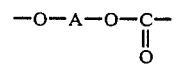

wherein —O—A—O— is the radical of the diphenol employed.

Copolycarbonates which are preferred according to the invention are those which are obtained from the preferred furane-3,6-diols IIa to IId and one or more of the preferred diphenols of the formula III.

Particularly preferred copolycarbonates are those which are obtained from 1,4; 3,6-dianhydro-D-glucitol and 2,2-bis-(4-hydroxyphenyl)-propane.

The bis-chlorocarbonic acid esters or bis-bromocarbonic acid esters of the diols II, of the formula V

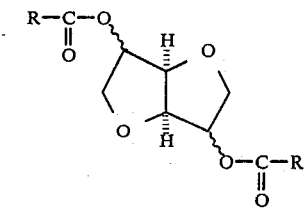

V wherein R denotes Cl or Br,
which are suitable for the preparation of the polycarbonates according to the invention by the phase boundary process are new and can be obtained by known methods from the diols of the formula II with excess phosgene or $COBr_2$, preferably in the presence of inert bases, such as, for example, tertiary aliphatic amines or tertiary aliphatic-aromatic amines, such as, for example, triethylamine or dimethylaniline, and if appropriate in the presence of an inert organic solvent, such as, for example, aliphatic halogenated hydrocarbons, such as $CH_2Cl_2$ or 1,2-dichloroethane. The reaction solution is worked up by a procedure in which the residual phosgene or $COBr_2$ is decomposed by adding water, the amines are removed by washing the mixture with water containing hydrochloric acid, the mixture is then washed with distilled water and the organic phase is dried. The bis-chlorocarbonic acid esters and bis-bromocarbonic acid esters which are suitable according to the invention can then be isolated in a pure form in a known manner, for example, by vacuum distillation.

The polycarbonates according to the invention can be modified in a known manner by incorporating small amounts, preferably 0.05 to 2.0 mol %, in each case relative to the organic dihydroxy compounds employed, of branching agents.

Examples of suitable branching agents are compounds which are trifunctional or more than trifunctional such as, for example, those with 3 or more phenolic hydroxyl groups, or isatin bisphenols according to German Auslegeschrift 2,500,092 (LeA 16,142), such as, for example, 3,3-bis-(4-hydroxyphenyl)-2-oxo-2,3-dihydroindole or 3,3-bis-(4-hydroxy-3-methylphenyl)-2-oxo-2,3-dihydroindole.

The polycarbonates according to the invention should as a rule have mean weight-average molecular weights $\overline{M}_w$ of 10,000 to over 200,000, preferably 20,000 to 80,000, determined by measuring the relative viscosity in $CH_2Cl_2$ at 25° C. and at a concentration of 0.5% by weight.

Heat stabilizers, UV light and oxidation which are customary in polycarbonate chemistry can be added to the polycarbonates according to the invention during or after their preparation. Mold release agents and flameproofing agents customary for polycarbonates can also be added.

The heterocyclic-aromatic copolycarbonates according to the invention are distinguished by their very good mechanical, thermal and dielectric properties, their resistance towards many chemical agents, their density and transparency. Their high heat stability and high glass transition temperature, which in some cases exceeds those of the known bisphenol A polycarbonate are of particular value. Thus, the glass transition temperature of a copolycarbonate according to the invention of 50 mol % of bisphenol A and 50 mol % of 1,4; 3,6-dianhydro-D-glucitol IIa is 162° C., while that of a pure bisphenol A polycarbonate is only 151° C. The glass transition temperatures are in each case determined at a rate of heating of 20° K./minute on samples with a solution viscosity of $\eta_{rel}$ of 1.30.

The thermoplastic polycarbonates mentioned are used in particular as structural materials for various applications, such as, for example, machine components, automobile components, casings, containers and electrical components. They can be processed by general methods of shaping, for example injection molding, extrusion and compression molding. Furthermore, because of the good solubility of the polycarbonates in chlorinated hydrocarbons, for example methylene chloride, films which can be used either as electrical insulating films or as carrier films can be produced by the casting process.

Dyestuffs, pigments, fillers and organic and inorganic fibers, such as, for example, glass fibers, can also be incorporated in the polycarbonates according to the invention in the amounts customary for polycarbonates.

Other thermoplastics, such as, for example, ABS, thermoplastic polyesters and in particular, other thermoplastic polycarbonates based on diphenols, can also be admixed with the polycarbonates according to the invention in any desired amounts, preferably in amounts of up to about 50% by weight, relative to the total weight of polycarbonates according to the invention and the other thermoplastics, in order to modify further the pattern of properties of the polycarbonates according to the invention.

EXAMPLES

Comparison Example 1

For this example, Example 5 of British Patent Specification No. 1,079,686 is repeated. 14.6 g (0.1 mol) of 1,4; 3,6-dianhydro-D-glucitol, IIa, and 21.4 g (0.1 mol) of diphenyl carbonate are melted at 220° C. under $N_2$. 18.8 g of phenol are distilled off and the mixture is then subsequently stirred for further 30 minutes under 1 mm Hg.

The resulting polycarbonate is pale brown and essentially transparent, but include dark brown portions and the polycarbonate can be broken up by manual pressure. The solution viscosity $\eta_{rel}$ (0.5 g in 100 ml of $CH_2Cl_2$ at 25°) is 1.186 (after separating off insoluble constituents).

Comparison Example 2

Comparison Example 1 is repeated except that 14.6 g (0.1 mol) of 1,4; 3,6-dianhydro-D-mannitol, IIb, is being reacted. After a few minutes, even before the theoretically calculated amount of phenol has been distilled off, a grey-brown mass which can no longer be melted without decomposition, separates out. The product is not transparent, is insoluble in most organic solvents and is exceptionally brittle.

Comparison Examples 1 and 2 thus show that homopolycarbonates of the furane-3,6-diols II are unsuitable as thermoplastic materials.

Comparison Example 3

20.0 g (0.5 mol) of NaOH, 22.8 g (0.1 mol) of bisphenol A and 14.6 g (0.1 mol) of 1,4; 3,6-dianhydro-D-glucitol are dissolved in 600 ml of water under $N_2$. After adding 600 ml of $CH_2Cl_2$, 30 g (0.3 mol) of phosgene are passed into the mixture, while stirring intensively. The aqueous phase is free from bisphenolate. 3 ml of a 3% strength triethylamine solution are added and the mixture is subsequently stirred for 60 minutes. The organic phase is separated off, shaken with 100 ml of 5% strength phosphoric acid and washed with distilled water until free from electrolyte. The solution is evaporated. 23 g of colorless polycarbonate with a $\eta_{rel}$ of 1.19 are obtained. However, investigation by IR and NMR spectroscopy shows that the product is a pure bisphenol A polycarbonate.

Comparison Example 3 thus shows that copolycarbonates of the heterocyclic diols of formula II and aromatic bisphenols cannot be prepared by the two-phase boundary phosgenation process.

Example 1

Bis-chlorocarbonic acid ester of 1,4; 3,6-dianyhydro-D-glucitol.

43.8 g (0.3 mol) of 1,4; 3,6-dianhydro-D-glucitol are initially introduced into the reaction vessel at 0° C. as a suspension in 400 ml of methylene chloride. 89.5 g (0.9 mol) of phosgene are passed in. A solution of 76.2 g (0.63 mol) of dimethylaniline in 100 ml of methylene chloride is added dropwise at 0±2° C. in the course of 30 minutes. The mixture is subsequently stirred at 25° C. for 2 hours and excess phosgene is then decomposed by adding water. The mixture is washed with water containing hydrochloric acid and then several times with distilled water and dried. The methylene chloride is evaporated off and the residue is distilled under a high vacuum. 70 g (86.1% yield) of a colorless oil with a boiling point of 134° C./0.8 mm Hg are obtained. The oil solidifies to give colorless crystals having a melting point of 44° C.

Analysis: Cl actual: 25.9%. Cl calculated: 26.2%.

Example 2

Bis-chlorocarbonic acid ester of 1,4; 3,6-dianhydro-D-mannitol.

1,4; 3,6-dianhydro-D-mannitol is reacted in the same manner as described in Example 1. 64 g (78.6%) of a colorless oil with a boiling point of 155° C./1 mm Hg are obtained.

Analysis: Cl actual: 26.3%. Cl calculated: 26.2%.

Example 3

Copolycarbonate of 1,4; 3,6-dianhydro-D-glucitol and bisphenol A.

20.0 g (0.5 mol) of NaOH, 22.8 g (0.1 mol) of bisphenol A, 300 mg (0.002 mol) of p-tert.-butylphenol and 322 mg (0.001 mol) of tetrabutylammonium bromide are dissolved in 500 ml of water, under $N_2$. After adding 500 ml of $CH_2Cl_2$, a solution of 27.1 g (0.1 mol) of the bis-chlorocarbonic acid ester of 1,4; 3,6-dianhydro-D-glucitol in 100 ml of $CH_2Cl_2$ is added dropwise at room temperature, while stirring vigorously. The mixture is subsequently stirred for 60 minutes. The organic phase is separated off, shaken with 100 ml of 5% strength phosphoric acid and then washed until free from electrolyte, by repeated shaking with distilled water. The solution is evaporated. 38 g of a colorless, clear polycarbonate with a $\eta_{rel}$ of 1.301 are obtained.

The glass transition temperature (Tg) (determined with a differential thermoanalyzer at a rate of heating of 20° K./minute) is 162° C.

Example 4

Copolycarbonate of 1,4; 3,6-dianhydro-D-mannitol and bisphenol A.

Example 3 is repeated except that 27.1 g (0.1 mol) of the bis-chlorocarbonic acid ester of 1,4; 3,6-dianhydro-D-mannitol is employed.

The resulting copolycarbonate is colorless and clear and has a $\eta_{rel}$ of 1.284 and a glass transition temperature (Tg) of 133° L C.

Example 5

Copolycarbonate of 1,4; 3,6-dianhydro-D-glucitol and 1,1-bis-(4-hydroxyphenyl)-cyclohexane.

Example 3 is repeated except that 26.8 g (0.1 mol) of 1,1-bis-(4-hydroxyphenyl)-cyclohexane is employed. The resulting copolycarbonate is colorless and clear and has a $\eta_{rel}$ of 1.265 and a glass transition temperature (Tg) of 176°.

Example 6

Copolycarbonate of 1,4; 3,6-dianhydro-D-glucitol and 4,4'-dihydroxydiphenyl sulphide (bisphenol S).

Example 3 is repeated except that 21.8 g (0.1 mol) of 4,4'-dihydroxydiphenyl sulphide is employed. The resulting copolycarbonate is colorless and clear and has a $\eta_{rel}$ of 1.259 and a glass transition temperature (Tg) of 132°.

Example 7

Copolycarbonate of 1,4; 3,6-dianhydro-D-glucitol and bisphenol A.

3,000 g (75 mols) of NaOH, 3,192 g (14 mols) of bisphenol A and 42 g (0.28 mol) of p-tert.-butylphenol are dissolved in 40 l of $H_2O$. After adding 40 l of $CH_2Cl_2$, a solution of 271 g (1.0 mol) of the bis-chlorocarbonic acid ester of 1,4; 3,6-dianhydro-D-glucitol in 500 ml of $CH_2Cl_2$ is added dropwise at 20° C., while stirring intensively. The mixture is subsequently stirred for 10 minutes. 1,980 g (20 mols) of phosgene are then introduced. The aqueous phase is free from bisphenolate. 15 g of triethylamine are added and the mixture is subsequently stirred for 60 minutes. The aqueous phase is separated off and the organic phase is acidified with 2% strength phosphoric acid and then washed with distilled water until free from electrolyte. 7 kg of chlorobenzene are added. The solution is evaporated and transferred to a vacuum extruder. Extrusion at 270° gives 3.2 kg of clear, colorless granules having a $\eta_{rel}$ of 1.315. A molar ratio of bisphenol A: 1,4; 3,6-dianhydro-D-glucitol of 14:1 is established by NMR spectroscopy. The following values were determined by testing rods of this product:

| Vicat B: | 148° |
|---|---|
| Impact strength: | Unbroken |
| Notched impact strength: | 36.9 kJ/m² |
| Tensile strength: | 56.3 MPa |
| Elongation at break: | 84% |
| Yield stress: | 65.1 MPa |

Example 8

Copolycarbonate of 1,4; 3,6-dianhydro-D-glucitol and bisphenol A.

22.8 g (0.1 mol) of bisphenol A, 23.7 g (0.3 mol) of pyridine and 150 mg (0.001 mol) of p-tert.-butylphenol are dissolved in 400 ml of $CH_2Cl_2$, under $N_2$. A solution of 27.1 g (0.1 mol) of the bis-chlorocarbonic acid ester of 1,4; 3,6-dianhydro-D-glucitol in 100 ml of $CH_2Cl_2$ is added dropwise at +2° C. in the course of 30 minutes. The mixture is subsequently stirred at 0° to +5° C. for 3 hours. After filtering, the organic phase is washed with dilute HCl, and then with distilled water until freed from electrolyte. The solution is added dropwise to methanol. 36 g of a light polycarbonate powder having a $\eta_{rel}$ of 1.231 are obtained.

What is claimed is:

1. A high molecular thermoplastic copolycarbonate comprising the product of the reaction of (i) at least one bis-halogencarbonic acid ester of a diol selected from the group consisting of

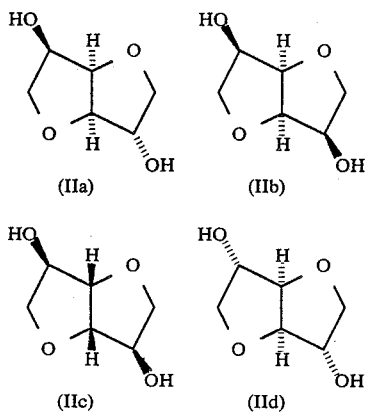

and (ii) at least one aromatic diphenol, said product of reaction characterized in that 5 to 50 mole percent of the copolycarbonate structural units conform to carbonates of said diol.

2. The copolycarbonate of claim 1 wherein said reaction further comprises a member selected from the group consisting of $COBr_2$ and $COCl_2$.

3. The copolycarbonate of claim 1 wherein said structural units are present in an amount of 20 to 50 mol percent.

4. A process for the preparation of a high molecular weight thermoplastic polycarbonate comprising reacting 5 to 50 mole percent of at least one bis-halogeno carbonic acid ester conforming to

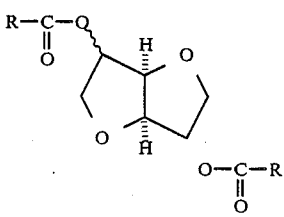

wherein R denotes chlorine or bromine, with 50 to 95 mol percent of at least one diphenol, said percents being relative to the total molar amount of said diphenol and said ester, at temperatures between 0° C. and 80° C. by the phase boundary process.

5. A process for the preparation of a high molecular weight thermoplastic polycarbonate comprising reacting 5 to 50 mol percent of at least one bis-halogeno carbonic acid ester conforming to

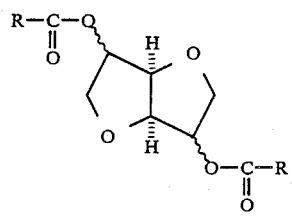

wherein R is chlorine or bromine with 50 to 95 mol percent of at least one diphenol, said percents being relative to the total molar amount of said diphenol and said ester, at temperatures between about −10° C. and 120° C., in a homogeneous solution with the addition of at least equivalent amounts of at least one tertiary organic base.

6. A process for the preparation of a high molecular weight thermoplastic polycarbonate comprising reacting 5 to 50 mol percent of at least one bis-halogeno carbonic acid ester conforming to

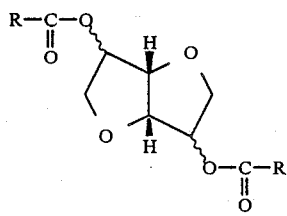

wherein R is chlorine or bromine with 50 to 95 mol percent of at least one diphenol, said percents being relative to the total molar amount of said diphenol and said ester at temperatures between about 0° C. and 80° C. by the phase boundary process.

7. A process for the preparation of a high molecular weight polycarbonate resin comprising reacting 5 to 50 mol percent of at least one bis-halogeno carbonic acid ester conforming to

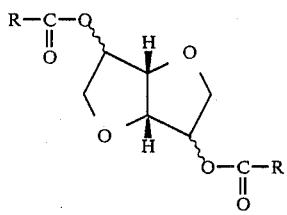

wherein R is chlorine or bromine with 50 to 95 mol percent of at least one diphenol, said percents being relative to the total molar amount of said diphenol and said ester at temperatures between about −10° C. and 120° C., in a homogeneous solution, with the addition of at least equivalent amount of at least one tertiary organic base.

8. The process of claim 6 comprising adding at least one chain stopper.

9. The process of claim 6 comprising adding phosgene or $COBr_2$ reactant.

10. The process of claim 7 comprising adding at least one chain stopper.

11. The process of claim 7 comprising adding phosgene or $COBr_2$ reactant.

12. The process of claim 4 comprising adding at least one chain stopper.

13. The process of claim 4 comprising adding phosgene or $COBr_2$ reactant.

14. The process of claim 5 comprising adding at least one chain stopper.

15. The process of claim 5 comprising adding phosgene or $COBr_2$ reactant.

* * * * *